Oct. 15, 1935.  L. J. REIZENSTEIN  2,017,164
PROCESS FOR POLYMERIZING CHINA WOOD OIL
Filed Feb. 2, 1932
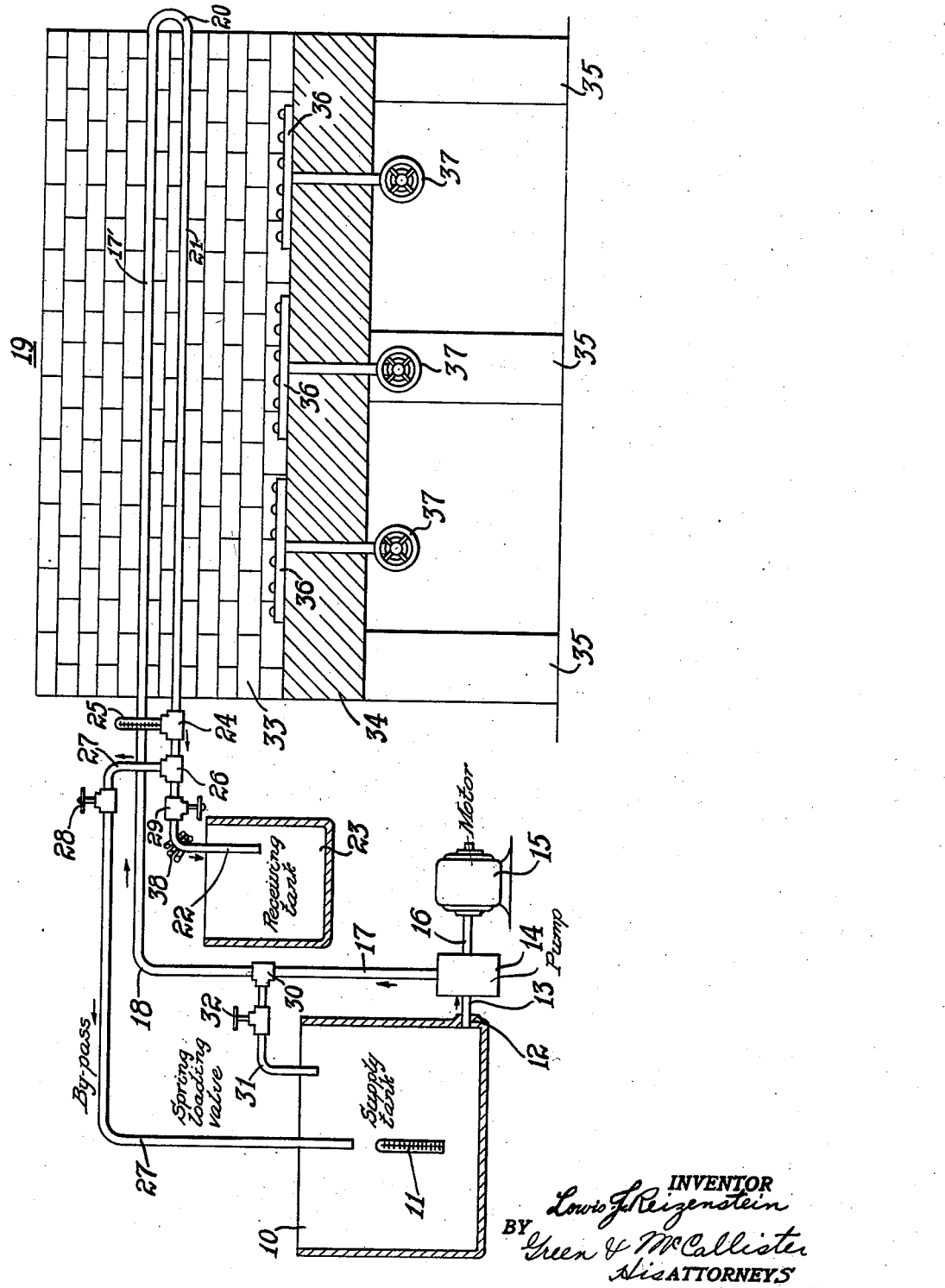
INVENTOR
Lowis J. Reizenstein
BY Green & McCallister
His ATTORNEYS Patented Oct. 15, 1935

2,017,164

UNITED STATES PATENT OFFICE 2,017,164

PROCESS FOR POLYMERIZING CHINA-WOOD OIL

Louis J. Reizenstein, Pittsburgh, Pa.

Application February 2, 1932, Serial No. 590,389

1 Claim. (Cl. 87—12)

This invention relates to a process and system for treating or processing China-wood oil and more specifically to the polymerization or "bodying" thereof.

As is known, oils like China-wood or tung oil, which are extensively used in the paint, varnish and lacquer industry are, in their raw state, normally unsaturated, but the molecules of which rather readily combine or polymerize, as is understood by those skilled in this art. Such polymerization, however, when the oil is at raised temperature generally continues rather rapidly once it has started and it is difficult to prevent it from reaching a completely or nearly completely polymerized state which in the paint, varnish and lacquer industry is undesirable, as such a product is of no use.

Prior to my invention no commercially successful process has, so far as I am aware, been developed to a useful degree whereby the desired amount of polymerization can be simply secured without substantially exceeding that amount. It has been attempted, for example, to alternately subject oils of this type to a heating medium and then to the open air but such is entirely useless and both ineffective and undependable. Again, the attempt has been made to heat oils of the above type under vacuum while subjecting them in a rather complicated way to a heat exchange apparatus, but such process is not successful and has not been used commercially as it does not provide a uniform dependable product which is not over-polymerized.

By the present invention I have provided a process and system for continuously polymerizing China-wood oil and the like under pressure thereby avoiding all the above noted and other defects and disadvantages and such constitutes one of the objects of the present invention.

Another object of the invention is the provision of a continuous closed process and system for polymerizing China-wood oil and the like which is simple and efficient and proportionately successful in practice.

A further object of the invention resides in a process and system for polymerizing China-wood oil and the like by passing the oil in a stream through a heating zone where it is rapidly heated to the desired degree and which is at the same time kept under pressure.

A further object is the treatment of China-wood oil to polymerize the same to the desired degree without the use of any complicated apparatus or expensive chemicals so that the cost of the polymerized oil is considerably lowered.

Other and further objects and advantages will be understood by those skilled in this art or will be pointed out hereinafter.

In the accompanying drawing, I have illustrated schematically a preferred system embodying the present invention and in which the present process can be efficiently carried out.

Referring first to the drawing in detail the numeral 10 represents a suitable supply tank or the like in which, for example, a large quantity of raw oil to be processed is kept and to which, as desired, fresh oil can be continuously added. The numeral 11 diagrammatically represents a thermometer of any suitable type by means of which the temperature of the raw oil or, as will be hereinafter apparent, the mixed raw and partly processed oil can be kept at desired temperature or at a known temperature. At 12, the tank 10 is suitably provided with an outlet in which is a suitable length of one-inch pipe 13 connecting said tank in the usual manner with the intake side of a pump 14, which may be electrically driven by the motor 15 through shaft 16, or of any other suitable type.

From the discharge side of said pump 14 extends the 1" vertical pipe 17 which, at a suitable height, has a right-angled bend 18 so that the pipe is thereafter horizontal and this horizontal part 17' of the pipe 17 extends as shown into a furnace or heating zone designated generally by the numeral 19. At the end of the furnace said horizontal pipe has a return bend 20 which, as shown, may be exposed to the atmosphere, the pipe thereafter returning at 21 parallel to the pipe 17' and extending from the furnace or heating zone 19, terminating in a vertically downwardly extending portion 22 which projects into a suitable receiving tank or other receptacle 23.

Just beyond the furnace or heating zone 19, the pipe 21 is provided with a T-joint 24 extending from which is a suitable thermometer 25 which projects down into the pipe and into the oil so as to measure the actual temperature thereof. In practice said thermometer is so arranged that it screws into the T-joint, forming a tight connection. Adjacent this first T-joint 24 is a second T-joint 26 from which extends the by-pass pipe 27 which leads, as shown, back into supply tank 10. Bypass pipe 27 is provided as shown with a suitable valve 28 so that the flow through the by-pass can be increased or diminished at will.

Just prior to the entry of the return pipe 21 into receiving tank or receptacle 23, a needle valve 29 is provided therein for a purpose to be hereinafter explained. On the vertical section of pipe 17 extending from the discharge side of pump 14 is another T-joint 30 to which is connected a short pipe 31 discharging into supply tank 10 and this section of pipe 31 is provided with a spring-loaded release valve 32 which may be set to open at a desired pressure and which in the present case is set to open at about 150 pounds per square inch of pressure. The pipe passing through the furnace or heating zone is likewise one-inch pipe as, in fact, is substantially all the pipe.

The furnace or heating zone 19 consists of the brickwork 33 supported by suitable beams or girders 34 resting upon vertical supports 35. Provided in said furnace are the gas burners 36 which are used for heating purposes and these gas burners may readily be controlled such as by valves 37. Where the pipe subjected to the heat in the heating zone is one-inch pipe the furnace is preferably about two feet from the top of the brickwork to the bottom of the girders and this has been found to be a desirable relationship which may, of course, be maintained proportionately when changing either the size of the pipe or the size of the furnace. It is to be understood that the furnace shown is more or less exemplary, but is preferably such that the oil passing therethrough may be rapidly raised in temperature to about five or six hundred degrees fahrenheit, preferably to about 580° F., although this temperature naturally depends upon various conditions and the particular oil used.

In operation, assuming that a sufficient supply of raw oil has been placed in supply tank 10, needle valve 29 is closed and pump 14 is started, valve 28 in pipe 27 being open to a greater or lesser extent. The gas burners 36 are now lighted, rapidly imparting their heat to the surroundings and the oil passing through pipes 17' and 21 becomes quickly heated in its passage through the furnace and the temperature at which the oil leaves the furnace is constantly indicated by the thermometer 25. It is clear that the first oil passing through the furnace must seek outlet through pipe 27 since valve 28 is the only one which is open. When the thermometer 25 shows that the oil passing from the heating zone is about 580° F. or is at whatever temperature has been predetermined needle valve 29 is gradually opened somewhat and valve 28 is gradually closed.

The pump 14 is of such capacity that it is at all times able to pump into the system much more oil than can be discharged through needle valve 29 and this results in a considerable pressure being imparted to the oil in the system which in the present instance amounts to about one hundred and fifty pounds per square inch of pressure and it is clear that the various elements of the system are suitably chosen and/or adjusted to yield this pressure. In order that too much pressure may not be imparted to the oil the spring-loaded release valve 32 is adjusted to open at the optimum pressure desired in the system, 150 lbs. per square inch, for example, so that if the oil tends to increase in pressure beyond the setting of the spring-loaded release valve such valve will automatically open and allow oil to be discharged back into the supply tank 10 until the pressure in the system has again reverted or decreased below the release-pressure of the valve. In other words, the spring-loaded release valve is in effect a safety valve.

As will, therefore, be understood from the foregoing after the process gets under way and the burners are regulated to give the desired heat and the needle valve regulated to discharge the desired amount the process goes on continuously as long as there is oil in the supply tank. Clearly by keeping a supply of oil in the supply tank the process can go on indefinitely. The polymerized oil discharging into receiving tank 23 has been rapidly lowered in temperature so that it is below the flash point and means can be utilized such as a suitable water jacket 38 around the discharge elbow to insure that the oil is cooled at least below the flash point or tank 23 can be cooled suitably.

Such oil is found to be rapidly and effectively prepared from the raw oil and I believe while not limited thereto that the combination of the heat and pressure in some way facilitates the proper polymerization. It is further apparent that the system is subject to close control and that when once adjusted needs no appreciable attention. Were the oil over polymerized, that is, were the polymerizing action permitted to go to its natural conclusion or end, a product of substantially jelly-like or even solid characteristics would be obtained and inasmuch as I do not obtain any of this jelly-like or solid end product I know that the polymerization has not exceeded the desired extent.

It is clear that many of the details hereof are subject to considerable variation without departing from the spirit and scope of the invention. For example, the maximum temperature may be so chosen that the desired product is secured and, of course, the temperature depends upon the particular oil being processed and sometimes upon the peculiarities of any given oil. Again, the pressure is subject to considerable variation and the appropriate pressure may be readily secured by a suitable adjustment of valve 32. As to the furnace itself the details may be considerably varied provided that relatively rapid and satisfactory heating of the oil is efficiently obtained.

It is to be understood that while the invention has been explained in connection with China-wood oil or tung oil, it may be used for other oils such as linseed oil or any organic oil as animal, vegetable and fish oils, with any combination of China-wood oil and/or any of such other oils, or for gums and resins for use in the above connection.

What I claim as new and desire to secure by Letters Patent is:

The process of polymerizing an unsaturated glyceride oil such as China-wood oil, which comprises maintaining a suitable supply of oil, continuously pumping from the supply a stream of oil through a polymerizing zone, diverting a portion of the oil pumped from the supply back to the supply before reaching the polymerizing zone and creating a constant pressure gradient on the balance thereof in the neighborhood of 150 lbs./sq. in., discharging the oil from the polymerizing zone back to the supply until the oil leaving the polymerizing zone has attained the desired temperature, in the range from 500° to 600° F., and thereafter discharging the heated oil into a discharge tank.

LOUIS J. REIZENSTEIN.